United States Patent
McCrosky et al.

(10) Patent No.: US 6,876,650 B2
(45) Date of Patent: Apr. 5, 2005

(54) BIPARTITE GRAPHICAL CONNECTING SCHEDULING IN TIME AND SPACE SWITCH FABRICS

(75) Inventors: Carl Dietz McCrosky, Saskatoon (CA); Andrew Milton Hughes, Saskatoon (CA); Kenneth Evert Sailor, Saskatoon (CA); Paul Edmund Somogyi, Saskatoon (CA); James Ames Meacham, II, Framingham, MA (US)

(73) Assignee: PMC-Sierra, Inc., Burnaby (CA)

(*) Notice: Subject to any disclaimer, the term of this patent is extended or adjusted under 35 U.S.C. 154(b) by 872 days.

(21) Appl. No.: 09/766,602

(22) Filed: Jan. 23, 2001

(65) Prior Publication Data
US 2001/0036179 A1 Nov. 1, 2001

Related U.S. Application Data

(60) Provisional application No. 60/201,757, filed on May 4, 2000.

(51) Int. Cl.[7] ............................ H04L 12/50; H04Q 11/50
(52) U.S. Cl. ........................................ 370/370; 370/388
(58) Field of Search ................................. 370/357, 360, 370/369, 370, 375, 380, 387, 388, 371–374, 386

(56) References Cited

U.S. PATENT DOCUMENTS

| | | | | |
|---|---|---|---|---|
| 4,817,083 A | * | 3/1989 | Richards | 370/369 |
| 5,369,400 A | * | 11/1994 | Bowdon | 340/2.22 |
| 5,430,716 A | * | 7/1995 | Pawelski | 370/388 |
| 5,987,027 A | * | 11/1999 | Park et al. | 370/360 |
| 6,169,737 B1 | * | 1/2001 | Lindberg et al. | 370/376 |
| 6,335,930 B1 | * | 1/2002 | Lee | 370/387 |
| 6,470,011 B1 | * | 10/2002 | Tanimura et al. | 370/369 |

FOREIGN PATENT DOCUMENTS

EP  1049352 A2  * 11/2000  ........... H04Q/11/04

OTHER PUBLICATIONS

Nobuo Fujii, "Application of a Rearrangement Algorithm for Digital Cross–Connect System Control", 1989, IEEE, vol. 1, pp. 228–233.*
Joseph Y. Hui, Switching and Traffic Theory For Integrated Broadband Networks, Chapter 3 "Point–to–Point Multi–Stage Circuit Switching", Kluwer Academic Publishing, Jan., 1990.
C. Clos, "A Study of Non–blocking Switching Networks", Bell Syst. Tech. J., vol. 32, pp. 406–424, Mar. 1953.
M.C. Paul 1, "Reswitching of Connection Networks", Bell Syst. Tech. J., vol. 41, pp. 833–855, 1962.

* cited by examiner

Primary Examiner—Chau Nguyen
Assistant Examiner—Brad Mace
(74) Attorney, Agent, or Firm—Oyen Wiggs Green & Mutala LLP

(57) ABSTRACT

A method of adding a new connection (c, d) to a time:space:time switch fabric. The fabric has a set I of k input elements, a set M of m switch elements, and a set O of 1 output elements. Each input element contributes one input to each switch element, and each output element receives one output from each switch element. A state $S_m$ characterizes the switch elements as a set of ordered pairs (i, j), where (i, j) $\in S_m$ if and only if the $j^{th}$ output element is coupled to the $i^{th}$ input element through one of the switch elements. The range of $S_m$ is the set of outputs of $S_m$ such that if j $\in$ range($S_m$) then (i, j) $\in S_m$ for some i $\in$ I. The domain of $S_m$ is the set of inputs of $S_m$ such that if i $\in$ domain($S_m$) then (i, j) $\in S_m$ for some j $\in$ O.

6 Claims, 10 Drawing Sheets

BIPARTITE GRAPHICAL CONNECTING SCHEDULING IN TIME AND SPACE SWITCH FABRICS

REFERENCE TO RELATED APPLICATION

This application claims the benefit of U.S. Provisional Patent Application Ser. No. 60/201,757 filed May 4, 2000.

TECHNICAL FIELD

This invention relates to a method of scheduling connections for high speed, time division multiplexed (TDM) switching of signals through time:space:time switches.

BACKGROUND

Time and space switching fabrics have been used for many years in a variety of switching and multiplexing devices including SONET cross-connects, SONET add-drop multiplexers, SONET terminal multiplexers, and digital signal-level 0 (DS0) switches. Such fabrics use connection scheduling algorithms to map customers' connection requirements into switch settings for the fabrics' control registers. The basic scheduling problem is to find the switch settings required to properly route a set of connections.

The so-called "Slepian-Duguid" prior art algorithm has been used to schedule connections in rearrangeably non-blocking switches. This algorithm makes use of "Paull's matrix", which is formed by labelling the switch's input ports as the matrix rows; and by labelling the switch's output ports as the matrix columns. Each matrix entry (i, j) is either blank, indicating no connection between switch input port i and output port j; or, contains an identifier for the intermediate switch on which the connection of input port i to output port j is allocated. The basic Slepian-Duguid algorithm is depicted in flowchart form in FIG. 1. Although the algorithm is shown with a failure terminal point, the failure only indicates that either the input port or output port has been over-allocated. The Slepian-Duguid algorithm always succeeds on loads of up to 100% capacity.

A simple 3 input to 3 output switch is shown in FIG. 2. The FIG. 2 switch has two intermediate 3×3 switches labelled "A" and "B". Each intermediate switch can accept one unit of data per cycle on each of its inputs and switch that unit on one of its outputs. Two data units may not utilize the same output at the same time. Therefore, inputs must be scheduled to prevent contention for the outputs of intermediate switches A and B. In practice, "A" and "B" may represent the same actual switch at different times: "A" could represent the switch during one cycle and "B" may represent the same switch during the following cycle. Such a switch could be used to switch 2-unit multiplexed traffic on its input ports. Alternatively, "A" and "B" could represent two separate switches which perform parallel switching functions, with data arriving at the input ports in parallel, two units wide.

The FIG. 2 switch is a simplified example of a "rearrangeably non-blocking" switch. Switch input port to output port "mappings" are represented as (n,m) where n designates one of the switch input ports, and m designates one of the A or B switch output ports. Thus, (1,3) represents a mapping of switch input port 1 to switch output port 3. A switch is "non-blocking" if every load of 100% or less can be mapped successfully from the switch's input ports to the switch's output ports. A switch is "rearrangeably non-blocking" if a new mapping may require the rearrangement of persistent connections. For the FIG. 2 switches A and B, a mapping is not over-allocated (100% load or less) if each input and output appears no more than twice in the mapping. For example, the mapping {(1, 2), (1,3), (2, 2), (3, 2)} is over-allocated because output port 2 appears three times in the mapping. Each output port of FIG. 2 switches A and B can accept at most two inputs and each input port of FIG. 2 switches A and B can contribute at most 2 inputs in a mapping.

Progress of the Slepian-Duguid algorithm in scheduling the mapping of connections {(1, 3), (2, 1), (2, 3), (3, 2), (3, 1)} is shown in FIGS. 3, 4, 5 and 6. The Paull's matrix of FIG. 3 depicts the initial state in which no connections have been scheduled. FIG. 4 depicts addition of the first connection, (1, 3), which is arbitrarily assigned to switch A as indicated in FIG. 1, block 12. FIG. 5 depicts addition of the next three connections (2, 1), (2, 3), (3, 2) with the second connection (2,1) having been assigned to switch A and connections (2, 3), (3, 2) assigned to switch B. FIG. 6 shows how the Slepian-Duguid algorithm rearranges the previous scheduling (i.e. that depicted in FIG. 5) to satisfy a request for an additional connection (3,1).

In FIG. 6, the underlined letters denote the previous (i.e. FIG. 5) switch assignments and the non-underlined letters denote the assignments required to permit addition of the newly requested connection (3,1). As indicated in FIG. 1, block 10 the algorithm tests the Paull's matrix representation of the FIG. 2 switch fabric to determine whether switch A is not yet mentioned in row i=3 and column j=1 of the matrix. As seen in FIG. 5, switch A is not mentioned in row 3; but, it is mentioned in column 1, in respect of the previously scheduled connection (2,1). The FIG. 1, block 10 test result is accordingly "no" and processing continues with block 14.

The algorithm then tests (block 14) the Paull's matrix representation of the FIG. 2 switch fabric to determine whether there is a switch A that does not occur in row i=3 and a switch B that does not occur in column j=1. In the case of the FIG. 5 matrix the answer is "yes" (i.e. there is no 'A' in row 3, and no 'B' in column 1 of the FIG. 5 matrix). The FIG. 1, block 14 test result is accordingly "yes", and processing continues with block 20. If the FIG. 1, block 14 test result had been "no" this would signify that the FIG. 2 switch fabric has insufficient resources to satisfy the (3,1) connection scheduling request and the algorithm would therefore terminate in failure mode as indicated in FIG. 1, blocks 16, 18.

The algorithm then schedules connection (3,1) for switch A as indicated in FIG. 1, block 20 and as illustrated in FIG. 6. It is then necessary to reschedule or "flip" connection (2,1) from switch A to switch B to prevent over-allocation of switch A's connection to output 1. This is accomplished as shown in FIG. 1, blocks 22–34. First, as indicated in block 22, the existing switch A entry (i.e. that for connection (2,1)) in column 1 is flipped to switch B (i.e. i'=2). A test (block 24) is then made to determine whether the Paull's matrix representation of the FIG. 2 switch fabric includes another entry for switch B in row i'=2. The answer in this case is "yes", namely the previously scheduled connection (2,3). This necessitates flipping connection (2,3) from switch B to switch A to prevent over-allocation of the input connection to switch B. More particularly, if the block 24 test result is "yes", processing continues with block 26 such that the existing switch B entry (2,3) is flipped to switch A (i.e. i'=2 and j'=3). The algorithm then tests (block 30) the Paull's matrix representation of the FIG. 2 switch fabric to determine whether there is another entry for switch A in column j'=3. If the answer is "no" the algorithm terminates successfully as indicated at block 34, but the answer in this case is "yes", namely the previously scheduled connection (1,3). This necessitates flipping connection (1,3) from switch A to switch B to prevent over-allocation of the input connection to switch A. More particularly, if the block 30 test result is "yes", processing continues with block 32 which assigns i=i'=2 and j=j'=3. Accordingly, when processing then continues with block 22, the existing switch A entry in row 1, column 3 is flipped to switch B (i.e. i'=1). The block 24 test is then again made to determine whether the Paull's matrix representation of the FIG. 2 switch fabric includes another entry for switch B in row 1. The answer in this case is "no", and the algorithm terminates successfully as indicated at block 28.

Any entry in the matrix may designate more than one switch to indicate a repeated connection. For example, if "A" and "B" appeared together in the matrix row-column entry corresponding to connection (3,1) this would indicate that both units of data contributed by input 3 are to be output on port 1.

A standard technique for optimizing the Slepian-Duguid algorithm is to find the fewest number of entries that need to be "flipped" and work in that direction. For example, if instead of assigning connection (3,1) to switch A as discussed above, connection (3,1) were instead assigned to switch B, then it would only have been necessary to flip connection (3,2) from switch B to switch A rather than making the three previously described flips. In any case, the number of rearrangements (flips) required to add any connection is limited by I+O where "I" is the number of inputs and "O" the number of outputs. In practice, if the shortest number of entries needing to be flipped is always chosen, then the number of rearrangements is reduced to min(I,O)−1.

Implementation of Paull's matrix as a two dimensional matrix of input ports to output ports is computationally expensive and unnecessary. Paull's matrix is a sparse matrix, in that most of the matrix row-column entries are blank. A significantly reduced representation of Paull's matrix can be constructed. Specifically, instead of the 2-dimensional matrices shown in FIGS. 3–6, one may use two one dimensional arrays as shown in FIGS. 7–8 to achieve a reduction in size due to the fact that an intermediate switch can only occur once per row and once per column.

In the first array (i.e. the left hand arrays of FIGS. 7–8), there are as many entries as the number of inputs, with each such entry consisting of a sub-array having as many entries as the number of intermediate switches. In the sub-array, each entry is set to null if the corresponding intermediate switch is not used by the corresponding input. If an intermediate switch is used by an input, then the entry for that switch designates the output to which that switch directs the input. Similarly, the second array (i.e. the right hand arrays of FIGS. 7–8), has as many entries as the number of outputs, with each such entry consisting of a sub-array having as many entries as the number of intermediate switches. In this sub-array, each entry is set to null if the corresponding intermediate switch is not used to deliver data to the corresponding output. If an intermediate switch delivers data to a particular output, then the entry for that switch designates the input from which that switch directs the data.

More particularly, FIG. 7 is a compact representation of the Paull's matrix depicted in FIG. 5. The first (i.e. left hand) array has three entries (i.e. rows): one for each of the three inputs utilized by connections (1, 3), (2, 1), (2, 3), (3, 2). Each one of these three entries is a sub-array having two entries (i.e. columns): one for each of the two intermediate switches A and B. The second (i.e. right hand) array has three entries (i.e. rows): one for each of the three outputs utilized by connections (1, 3), (2, 1), (2, 3), (3, 2). Each one of these three entries is a sub-array having two entries (i.e. columns): one for each of the two intermediate switches A and B. FIG. 8 is a compact representation of the Paull's matrix depicted in FIG. 6 with the addition of connection (3,1) following the same path as described above. In FIG. 8, entries of the form x/y reflect the fact that prior to the addition of (3,1), x was the previous entry, with y being the new entry after addition of (3, 1). The compact representation improves the efficiency with which unused intermediate switches can be located.

The present invention simplifies solution of the connection scheduling problem by decoupling time cycles (or switch paths) into a plurality of independent "waves". Each wave clearly indicates the manner in which inputs and outputs utilized by that wave's time cycle (or switch path) are affected as switch labels are changed during different attempts to solve the connection scheduling problem. By contrast, it is difficult, using Paull's matrix representations consisting of only two input/output arrays, to predict what portions of the input or output arrays may be affected by changing switch labels during different attempts to solve the connection scheduling problem.

SUMMARY OF THE INVENTION

The invention provides a method of adding a new connection (c, d) to a time:space:time switch fabric. The fabric has a set I of k input elements, a set M of m switch elements, and a set O of l output elements. Each input element contributes one input to each switch element, and each output element receives one output from each switch element. A state $S_m$ characterizes the switch elements as a set of ordered pairs (i, j), where (i, j) $\in S_m$ if and only if the $j^{th}$ output element is coupled to the $i^{th}$ input element through one of the switch elements. The range of $S_m$ is the set of outputs of $S_m$ such that if j $\in$ range($S_m$) then (i, j) $\in S_m$ for some i $\in$ I. The domain of $S_m$ is the set of inputs of $S_m$ such that if i $\in$ domain($S_m$) then (i, j) $\in S_m$ for some j $\in$ O. If a switch state $S_m$ exists where c $\notin$ domain($S_m$) and d $\notin$ range($S_m$), then the new connection is added to $S_m$ as (c, d). If no such state exists, and if no switch state $S_m$ exists wherein c $\notin$ domain($S_m$), then the method terminates because c is fully allocated. If there is a switch state $S_m$ wherein c $\notin$ domain($S_m$), and if no switch state $S_n$ exists wherein d $\notin$ range($S_n$), then the method terminates because d is fully allocated. If such a state $S_n$ exists, the two states $S_m$, $S_n$ are joined to form a union J with each element (i', j') in J labelled u if (i', j') $\in S_m$, and each element (i', j') in J labelled v if (i', j') $\in S_n$. The new connection is then added to J as (c, d). A label (u or v) is allocated to the new connection. If new connection's label has not previously been allocated to a connection (i', d) $\in$ J the method terminates. Otherwise, the opposite label (v or u) is reallocated to connection (i', d) $\in$ J. If such opposite label has not previously been allocated to a connection (i', j') $\in$ J the method terminates. Otherwise, the originally selected label (u or v) is reallocated to connection (i', j') $\in$ J and the process repeats until no label conflicts remain. The originally selected label (u or v) is chosen to minimize the number of connections requiring reallocation of labels.

BRIEF DESCRIPTION OF DRAWINGS

FIG. 4 is a prior art Paull's matrix representation of the FIG. 2 switch after assigning connection (1,3) to switch A.

FIG. 5 is a prior art Paull's matrix representation of the FIG. 2 switch after assigning one additional connection (2,1) to switch A and assigning two additional connections (2,3) and (3,2) to switch B.

FIG. 6 is a prior art Paull's matrix representation of the FIG. 2 switch after Slepian-Duguid algorithmic rearrangement of the FIG. 5 representation to satisfy an additional request for connection (3,1).

DESCRIPTION

Figures 4, 5, 6:
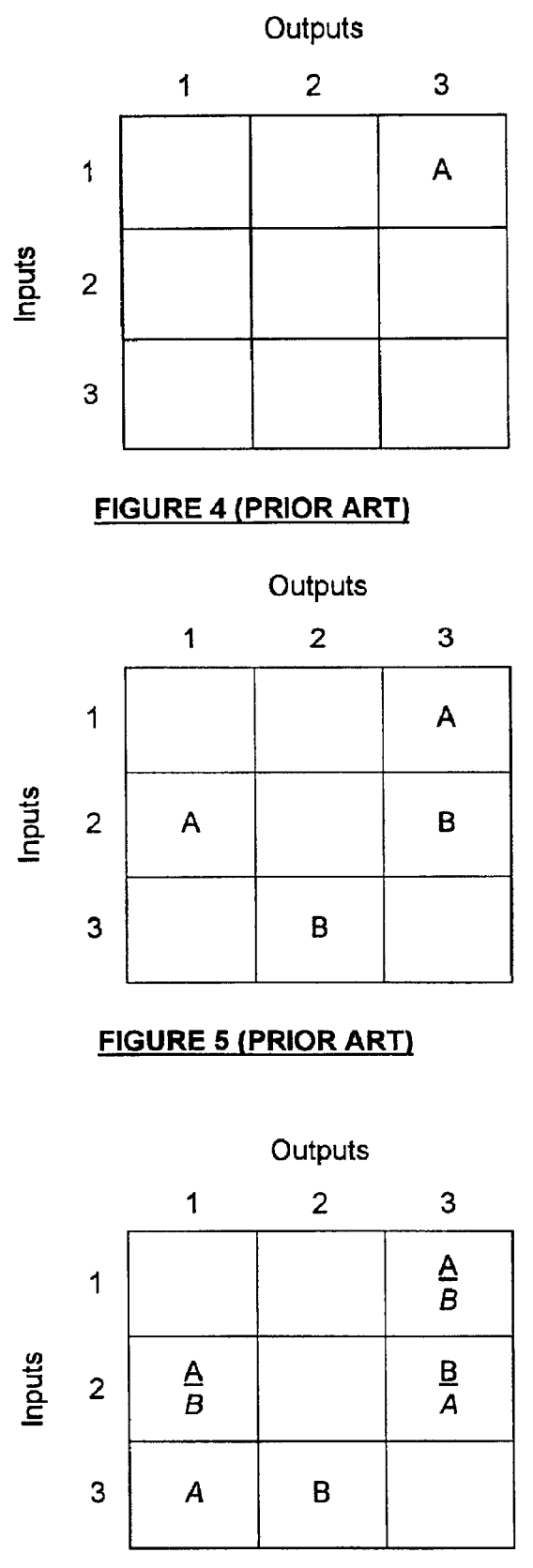
Figure 9:
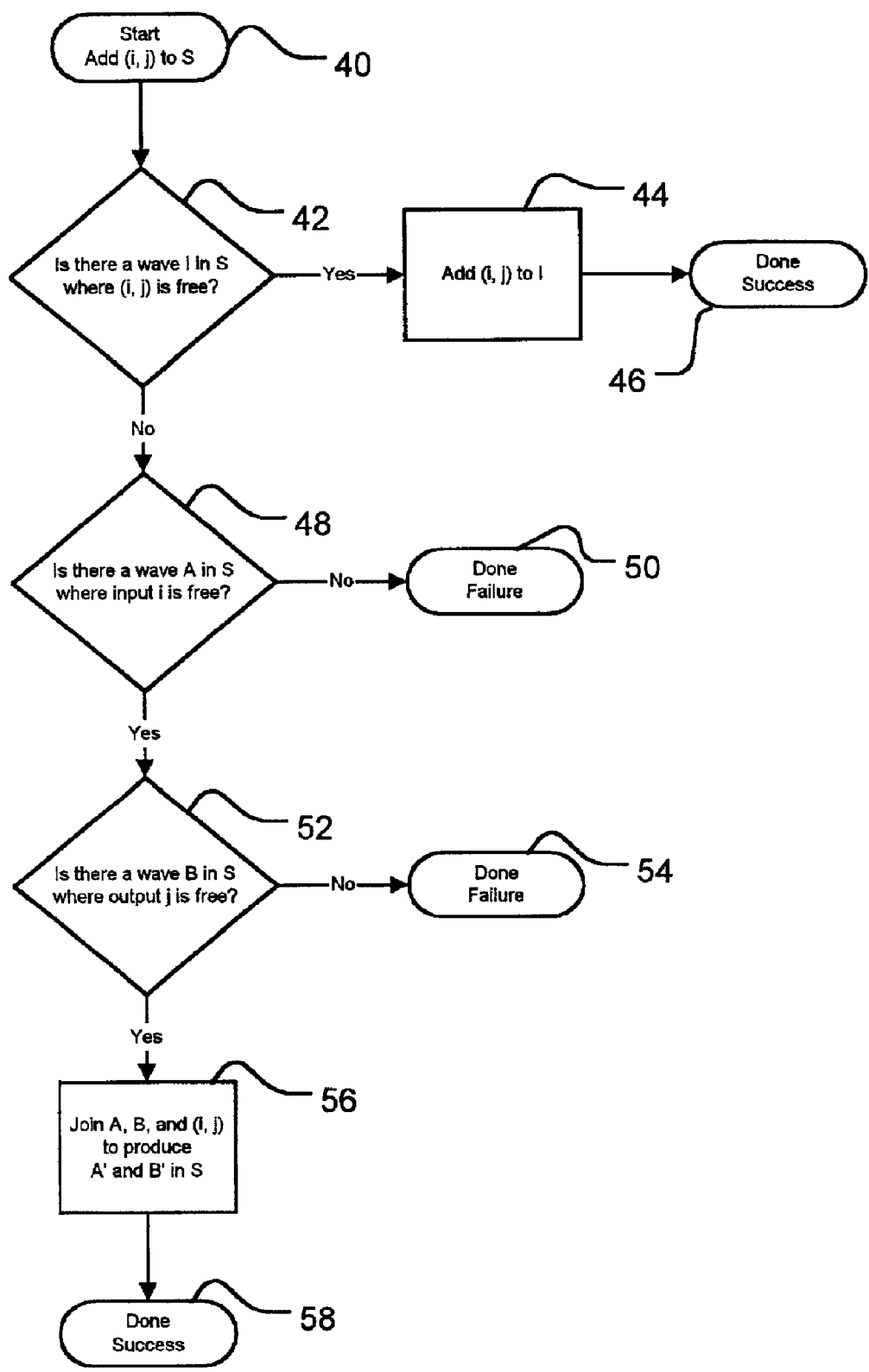
FIG. 9 is a flowchart depiction of the primary flow aspect of the present invention.
Figure 10:
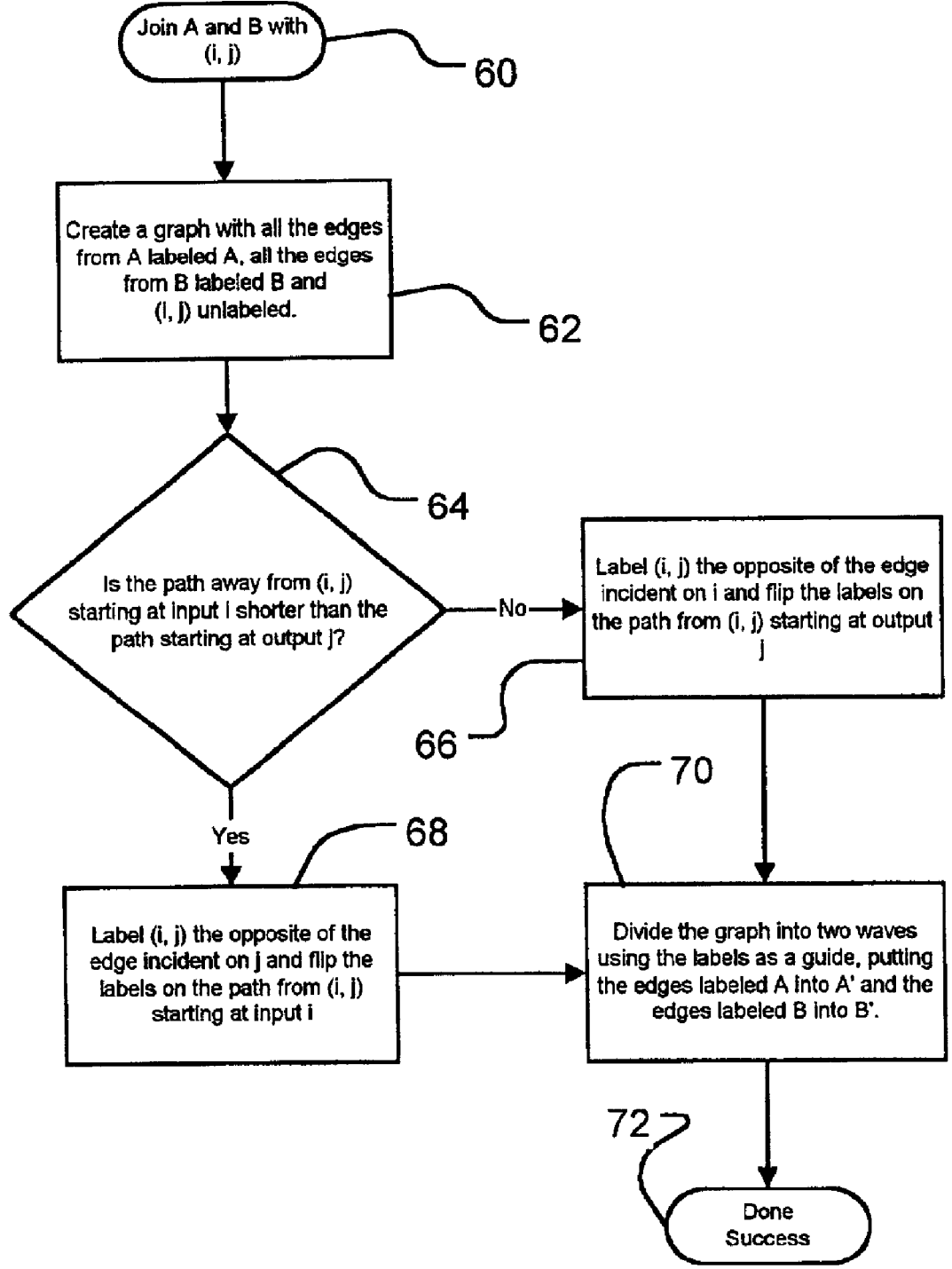
FIG. 10 is a flowchart depiction of the join flow aspect of the present invention.
Figure 11:
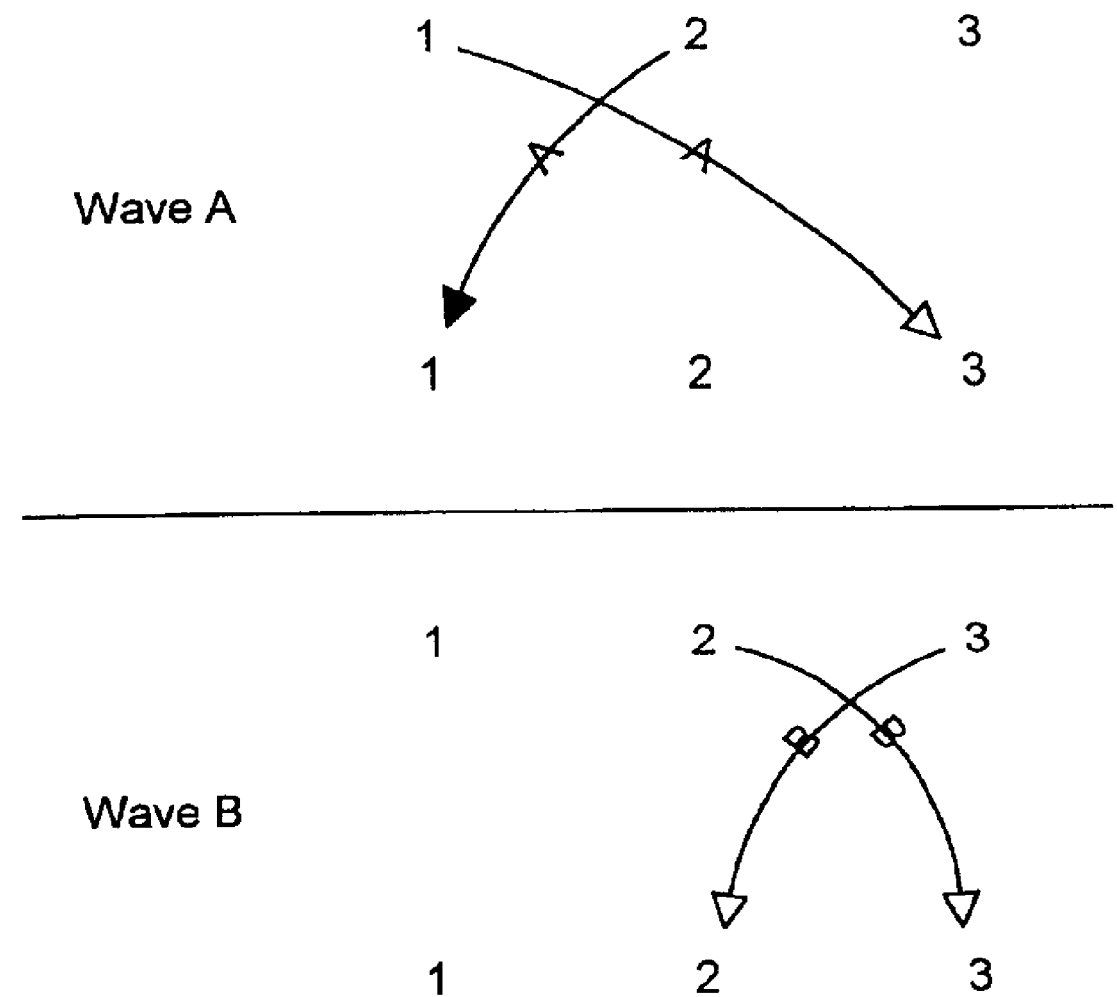
FIG. 11 is a bipartite graphical depiction of connection scheduling in accordance with the invention for the FIG. 2 switch, showing assignment of connections (1,3) and (2,1) to switch A ("wave A"), and assignment of connections (2,3) and (3,2) to switch B ("wave B").
Figure 12:
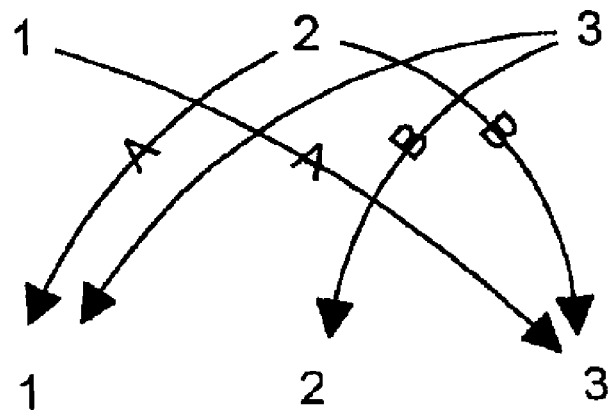
FIG. 12 depicts joinder of FIG. 11 waves A and B to satisfy an additional request for connection (3,1) in accordance with the FIG. 10 join flow aspect of the present invention.
Figure 12:
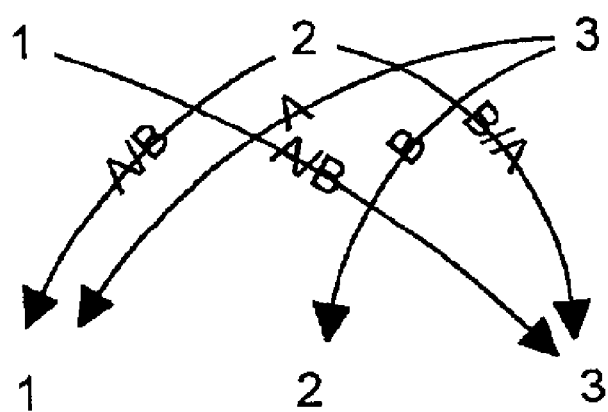
Figure 12:
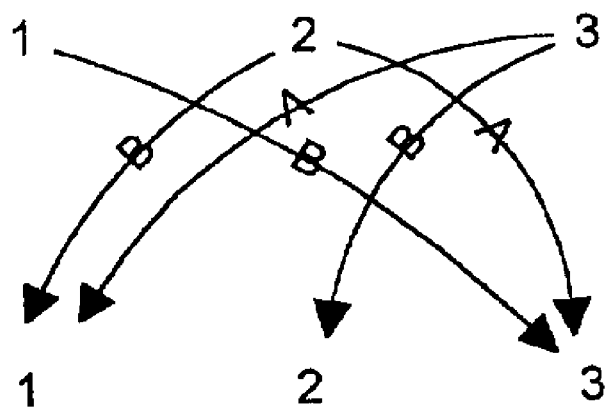
Figure 13:
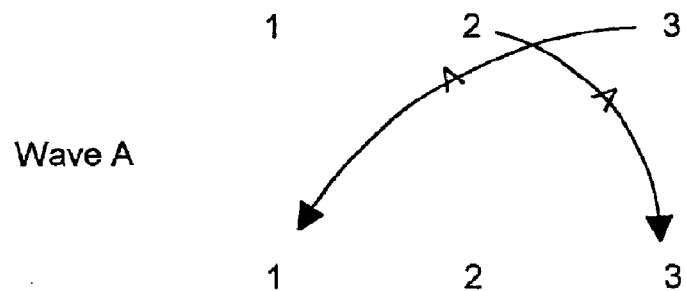
FIG. 13 depicts rearrangement of the joined FIG. 12 waves, in accordance with the present invention, to satisfy the five requested connections: (1,3), (2,1), (2,3), (3,2) and (3,1).
Figure 13:
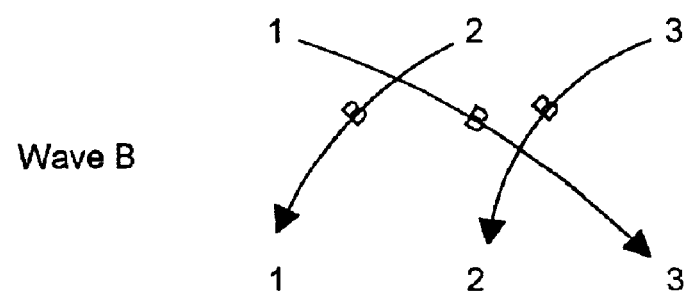

FIGS. 9 and 10 provide a simplified flowchart depiction of the methodology of the invention. FIGS. 11, 12 and 13 graphically depict the way in which the invention solves the connection scheduling problem described above with reference to FIGS. 4–6.

Figure 14:
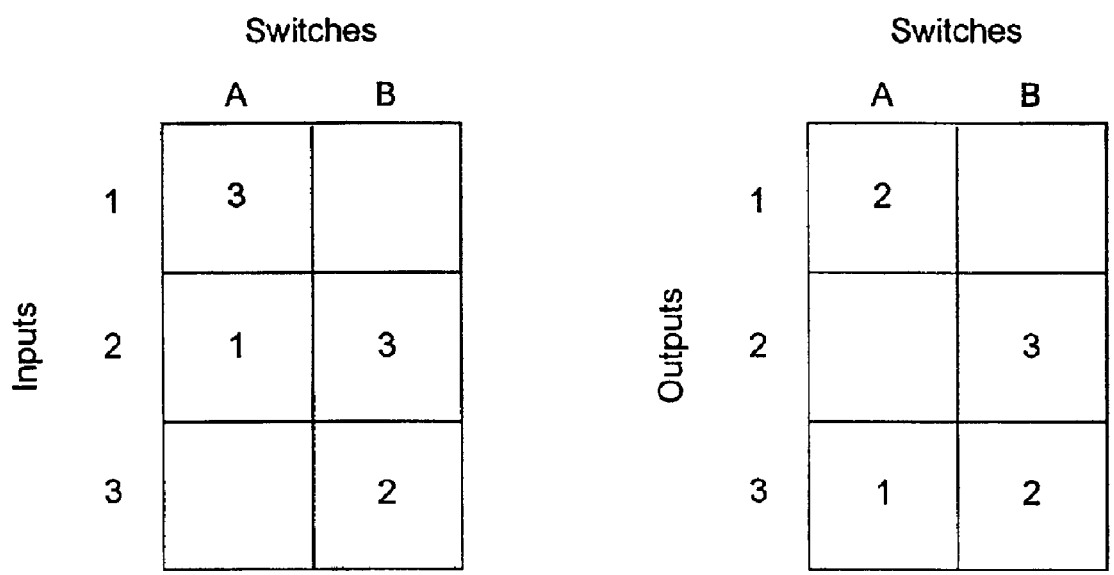
FIG. 14 is a compact Paull's matrix representation equivalent to FIG. 11.

The invention utilizes a data structure comprising an array of "waves", with each "wave" representing a cycle in time. The waves could alternatively represent parallel paths through switches, such as the switch of FIG. 2. Each wave is a graph of inputs and outputs. In each wave, at most one "edge" is allowed to start at an input and at most one edge is allowed to terminate at an output. This type of graph is called a "bipartite graph" since the graph can be described by two sets of nodes where all edges begin in one set and terminate in the other set. In this case the two sets of nodes are the set of inputs and the set of outputs. For example, FIG. 11 depicts two waves A and B with connections (1, 3), (2, 1), (2, 3), (3, 2) scheduled. More particularly, the upper wave A shows two edges corresponding to connections (1, 3), (2, 1) scheduled on switch A and the lower wave B shows another two edges corresponding to connections (2, 3), (3, 2) scheduled on switch B. FIG. 14 provides a compact Paull's matrix representation equivalent to FIG. 11.

In its most general form, the invention facilitates scheduling of connections for a time:space:time switch having a set I of k input elements, a set M of m switch elements, and a set O of l output elements. Each one of the k input elements can contribute one input to each one of the m switch elements. Each one of the m switch elements can receive one input from each one of the k input elements and switch those inputs to each one of the l output elements. Each one of the l output elements can receive one output from each one of the m switch elements. Since there are k input elements that can each contribute m inputs, the switch has km total inputs. Since there are l output elements that can each receive m inputs, the switch has lm total outputs. The following definitions are adopted to assist persons skilled in the art:

switch state S is the states of each of the m switch elements $S_m$ is the state of switch element m ∈ M, and is a set of ordered pairs (i, j) where (i, j) ∈ $S_m$ if and only if output element j receives the input from input element i through switch element m range($S_m$) is the set of outputs of $S_m$: if j ∈ range($S_m$), then (i, j) ∈ $S_m$ for some i ∈ I domain($S_m$) is the set of inputs of $S_m$: if i ∈ domain($S_m$), then (i, j) ∈ $S_m$ for some j ∈ O $|S_m|$ is the cardinality of $S_m$ (the number of elements in $S_m$); $|S_m| \leq k$ A switch is fully allocated if every output receives an input. Each output can only receive one input through switch element m (i.e. if (i, j) ∈ $S_m$ and if (x, j) ∈ $S_m$ then x=i). Otherwise, the output port would be over allocated. For the unicast case, each input can only appear once in $S_m$.

FIGS. 9 and 10 show how a new connection (c, d) is added to a switch consisting of I, M and O, with the state of M described by S. During the primary flow process which starts at block 40 depicted in FIG. 9, an attempt (block 42) is first made to find a wave in which both the input node and the output node have no attached edges. For example, in FIG. 11, wave A has no edges attached to input node 3 and output node 2; and, wave B has no edges attached to input node 1 and output node 1. If such a wave in which both the input node and the output node have no attached edges is found, then the edge may be added (FIG. 9, block 44) to the wave without any rearrangement of existing connections and the algorithm terminates successfully (block 46). If no wave having both input and output nodes free is found, then a further search (FIG. 9 blocks 48, 52) is made to locate two waves, one with the input free and one with the output free, and these two waves are then joined (block 56) by the process depicted in FIG. 10, blocks 60, 62, 64, 66, 68, 70 and 72. The algorithm then terminates successfully (FIG. 9, block 58). Like the Slepian-Duguid algorithm, the invention never fails on a 100% or lighter load. The failure termination points (FIG. 9 blocks 50, 54) are reached only if some input port or output port is over-allocated in a connection request.

More generally, a determination is made as to whether there exists a switch state $S_m$ such that c ∉ domain($S_m$) and d ∉ range($S_m$). If so, then connection (c, d) is simply added to $S_m$. If no such state exists, a further determination is made as to whether there exists a switch state $S_m$ such that c ∉ domain($S_m$). If not, the block 50 failure termination point is reached since c is already fully allocated. Otherwise, a further determination is made as to whether there exists a switch state $S_n$ such that d ∉ range($S_n$). If not, the block 54 failure termination point is reached since d is already fully allocated. If two such states $S_m$, $S_n$ exist such that c ∉ domain($S_m$) and d ∉ range($S_n$) then those states are joined to produce two new states, as is now described.

Let J be the union of $S_m$ and $S_n$ such that for each element (i', j') in J label (i', j')=u if (i', j') ∈ $S_m$ and label (i', j')=v if (i', j') ∈ $S_n$. Since the two states are joined, each input and each output can appear twice in the join, with the two appearances being disambiguated by the two aforementioned labels. After the join, no input appears in two ordered pairs having the same label; and, no output appears in two ordered pairs having the same label. The new connection (c, d) is now added to J. The fact that c ∉ domain($S_m$) and d ∉ range($S_n$) makes such addition possible, implies that c appears at most twice in J, and also implies that d appears at most twice in J.

The newly added connection (c, d) must be labelled in J. Suppose the label u is initially selected, such that label (c, d)=u. If there is a connection (i', d) ∈ J and if label(i', d)=u, then label(i', d) is changed to v to resolve this conflicting usage of label u. If there is a connection (i', j') ∈ J and if label(i', d)=v, then label(i', j') is changed to u to resolve this conflicting usage of label v. This chaining process may continue, but it must end eventually, because there are a finite number of ports and thus only k possibilities for input and k for output. So, unless the process cycles endlessly, the chain can have at most 2k links. Moreover, if the process does cycle, then the length of the cycle is always even because links exist only between inputs and outputs. Since cycle length is even, it is always possible to give cycle members alternating labels. It is arbitrary whether the new link is initially labelled u or v. The process can be optimized by determining which chain is shorter and choosing that one. Once all pairs have been labelled, J is then divided back into $S_m$, $S_n$ in accordance with the chosen labels.

Figure 1:
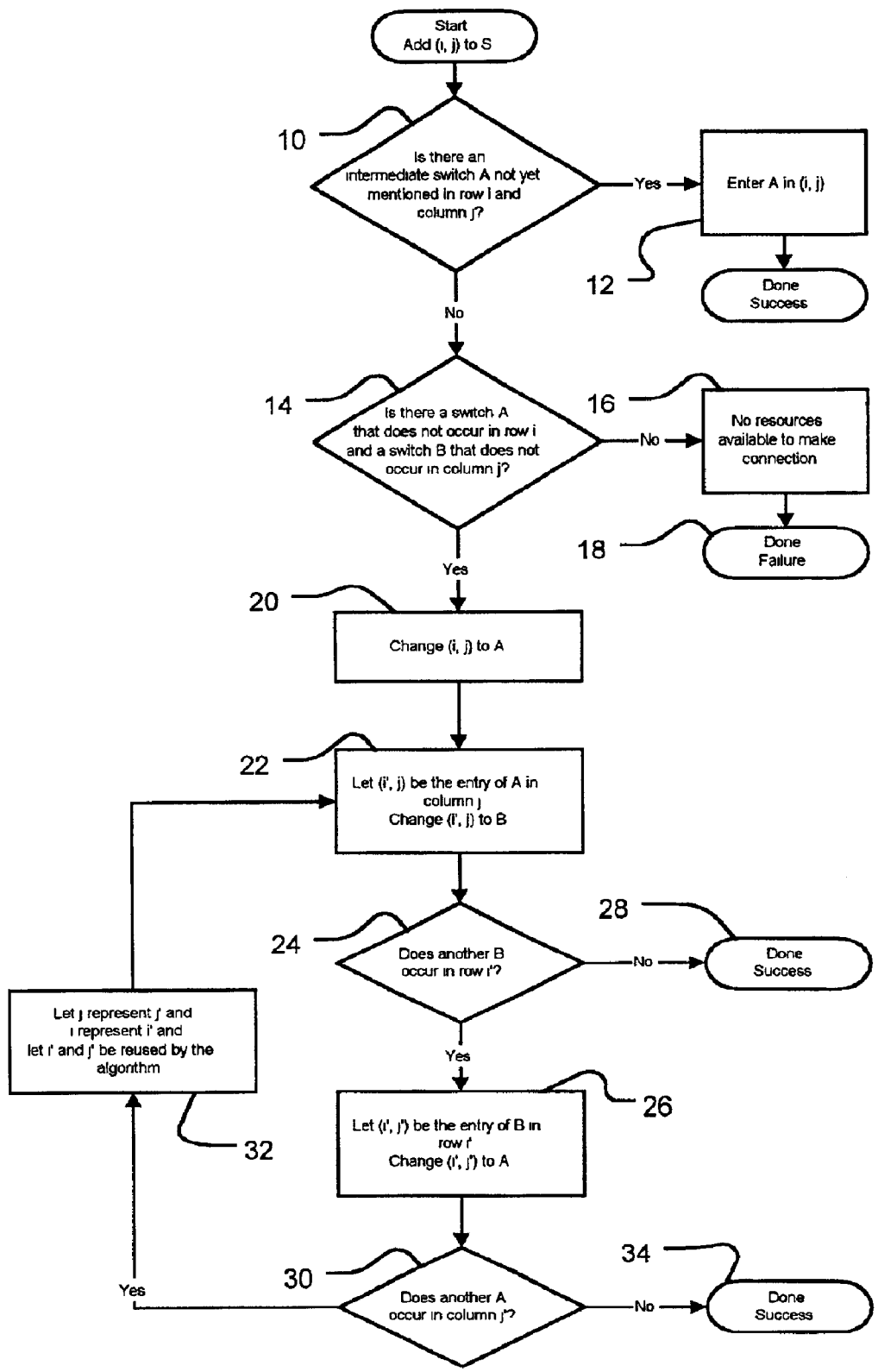
FIG. 1 is a flowchart depiction of the prior art Slepian-Duguid algorithm.
Figure 2:
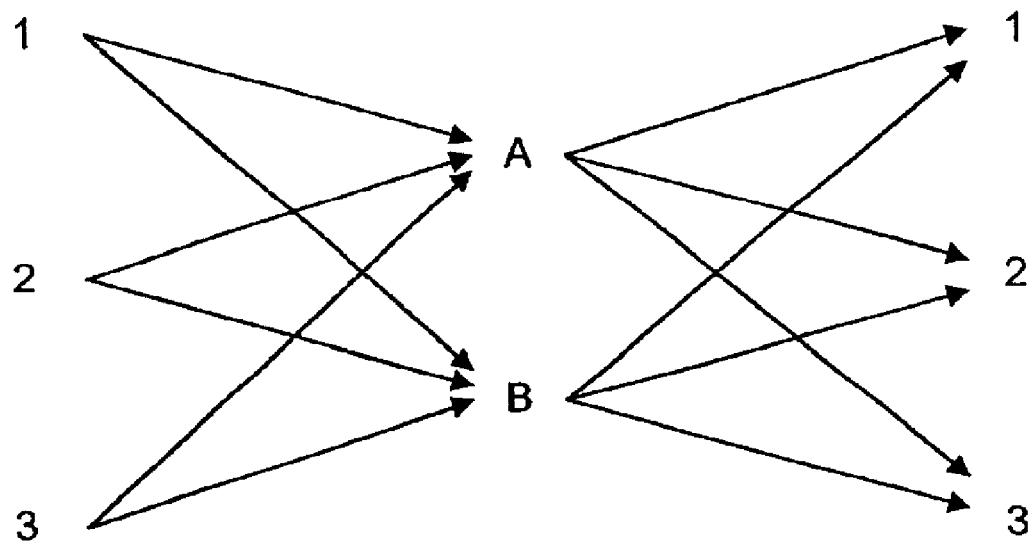
FIG. 2 schematically depicts a 3×2×3 prior art switch.
Figure 3:
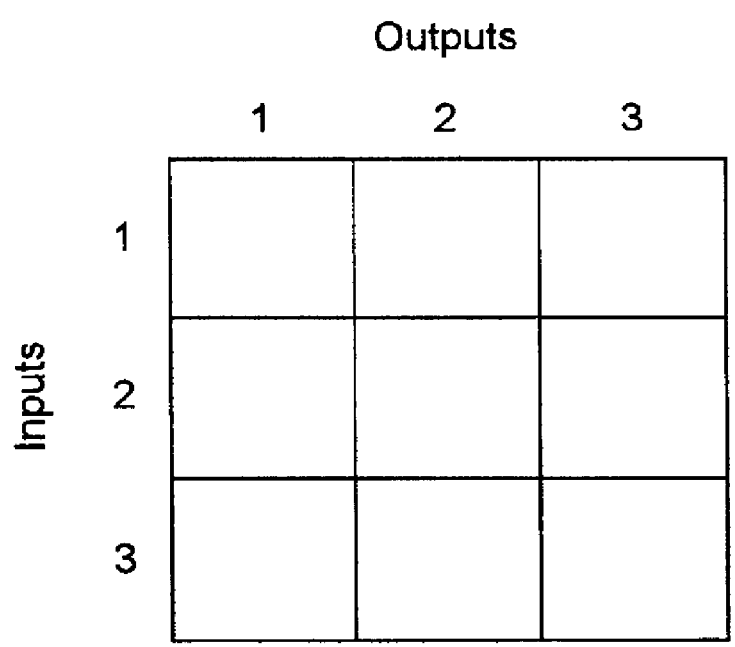
FIG. 3 is a prior art Paull's matrix representation of the initial state of the FIG. 2 switch.
Figure 7:
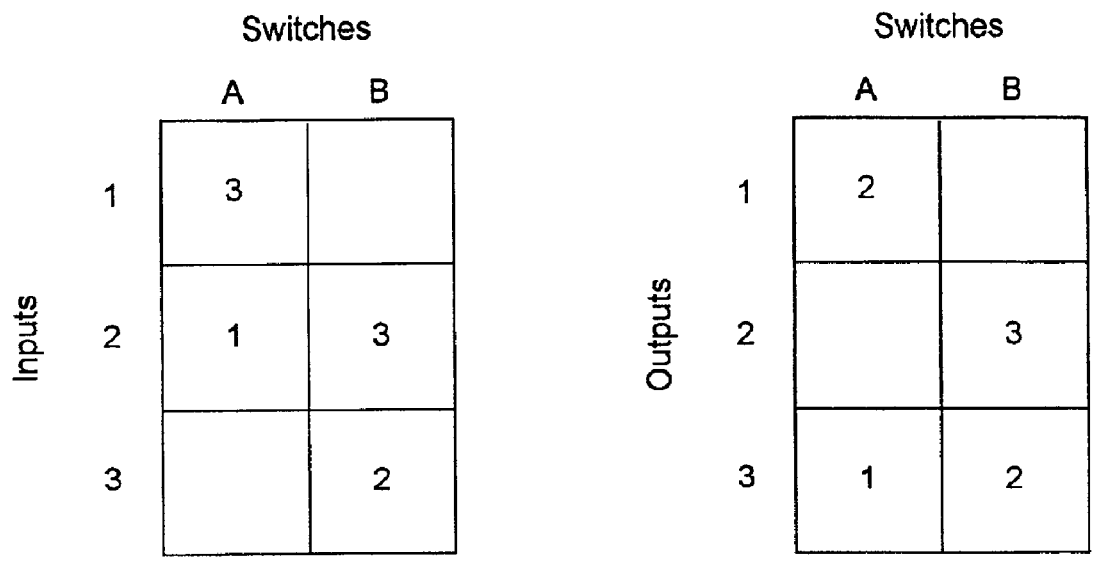
FIG. 7 is a prior art compact Paull's matrix representation equivalent to the FIG. 5 representation.
Figure 8:
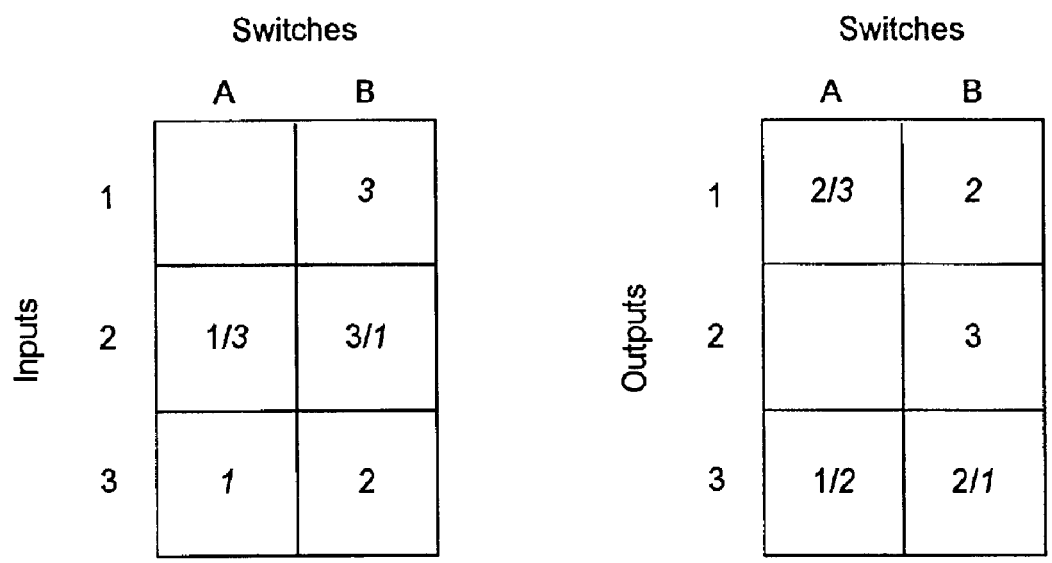
FIG. 8 is a prior art compact Paull's matrix representation equivalent to the FIG. 6 representation.

For example, suppose that a request for connection (3,1) arrives while the FIG. 2 switch is supporting the connection schedules depicted in FIG. 11. FIG. 12 shows how the FIG. 10 process joins FIG. 11 waves A and B with connection (3,1) to satisfy the new connection request. First, as indicated in FIG. 10, block 62 and as shown in the upper portion of FIG. 12, waves A and B are joined by creating a single graph which includes all of the edges of waves A and B, with each edge labelled to identify the wave in which that edge originated. The new connection (3,1) is unlabelled in the upper portion of FIG. 12.

To assist in contrasting the invention with the above description of the prior art Slepian-Duguid algorithm, edge label A is arbitrarily selected for the new connection (3,1). This results in termination of two edges labelled "A" at output 1, which is not permitted. To resolve this conflict, the label of the existing edge (2,1) is flipped from A to B. However this in turn results in two edges labelled "B" initiating at input 2, which is also not permitted. To resolve this conflict, the edge (2,3) is flipped from B to A, thus creating a second edge at output 3 with label A, which again is not permitted. The label of (1,3) is flipped to B, and since there is only one edge starting at input 1, the join is complete as shown in the central portion of FIG. 12 (with "A/B" indicating that a connection previously scheduled on switch A has been flipped to switch B, etc.). The lower portion of FIG. 12 is identical to the central portion but with the "previous" switch labels removed to show only the final switch labels.

Figure 15:
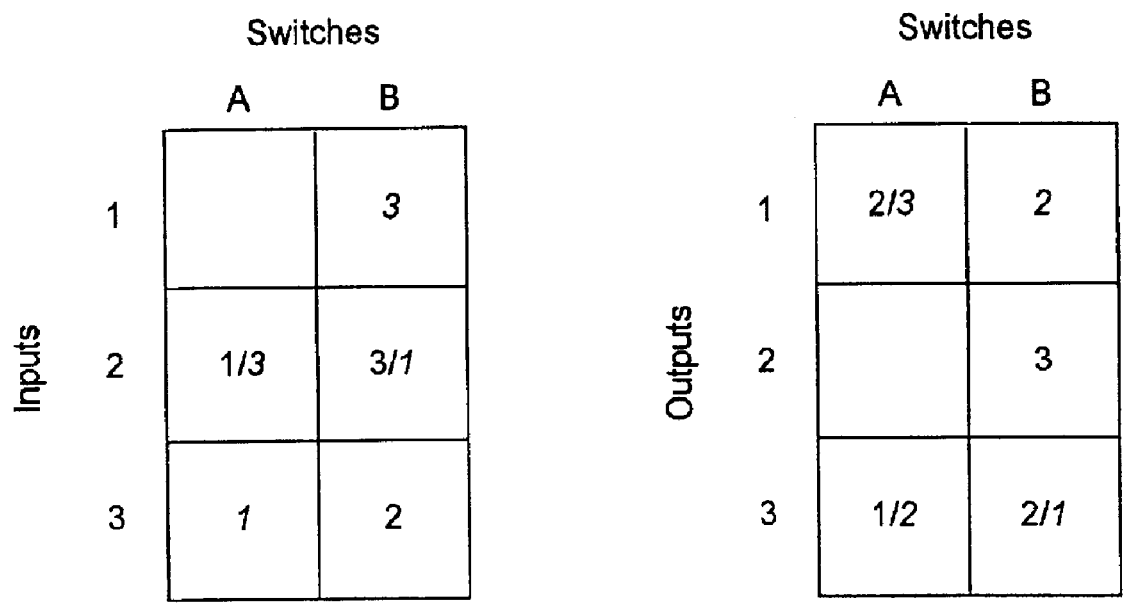
FIG. 15 is a compact Paull's matrix representation equivalent to FIG. 13.

The resultant graph shown in lower portion of FIG. 12 is then separated back into waves, using the edge labels as guides, with the result shown in FIG. 13. FIG. 13 is a valid scheduling maintaining the originally scheduled connections (1, 3), (2, 1), (2, 3), (3, 2) and including the newly requested connection (3,1). FIG. 15 provides a compact Paull's matrix representation equivalent to FIG. 13.

It will be noted that the compact form representation of Paull's matrix includes two 2-dimensional arrays relating ports to intermediate time stages. If only two waves are involved, the equivalent Paull's matrix representation resembles the wave structure, since each wave corresponds to one of the two arrays. However, if more than two waves are involved, the equivalent Paull's matrix representation bears no clear resemblance to the wave structure, since the wave structure has three or more waves whereas the equivalent Paull's matrix representation has only two arrays. The invention simplifies solution of the connection scheduling problem by decoupling time cycles (or switch paths) into a plurality of waves, each of which is independent from every other wave. By contrast, it is difficult, using only Paull's matrix representations, to predict what portions of the input or output arrays may be affected when switch labels are flipped during different attempts to solve the connection scheduling problem.

The invention thus affords significant ease of implementation and parallelization over the Slepian-Duguid algorithm. Specifically, unlike the Slepian-Duguid algorithm, the wave data structure utilized by the invention does not require optimization such as compaction or indirection in implementation to attain efficiency. This yields higher probability of successful implementation and affords greater opportunities for further optimization, such as parallelization by implementing the invention on multiprocessor computers using parallel programming techniques. Parallelizing an algorithm involves partitioning the algorithm in such a way that the work of the algorithm can be performed at the same time by more than one processor. The Slepian-Duguid algorithm is not well suited to parallelization since the processing path involving flipping intermediate switches through Paull's Matrix is difficult if not impossible to determine in advance. By contrast, once two waves are selected, in accordance with the present invention, for the addition of a new edge, the set of remaining waves are completely independent. Each join can be assigned to an additional processor to perform the wave update in parallel. The ability to utilize parallel processing affords substantial speed improvements in large switching systems.

Multicast Groups

Although the invention does not solve the general multicast problem for rearrangeably non-blocking networks, it can be extended to provide a restricted form of multicast which satisfies the connection requirements of a variety of protection schemes including 1+1, 1:N, UPSR and 2- and 4-BLSR, as well as satisfying test port needs. Such extension utilizes so-called "multicast groups", namely a group of devices that are considered as one device by the connection scheduling algorithm.

Figure 16:
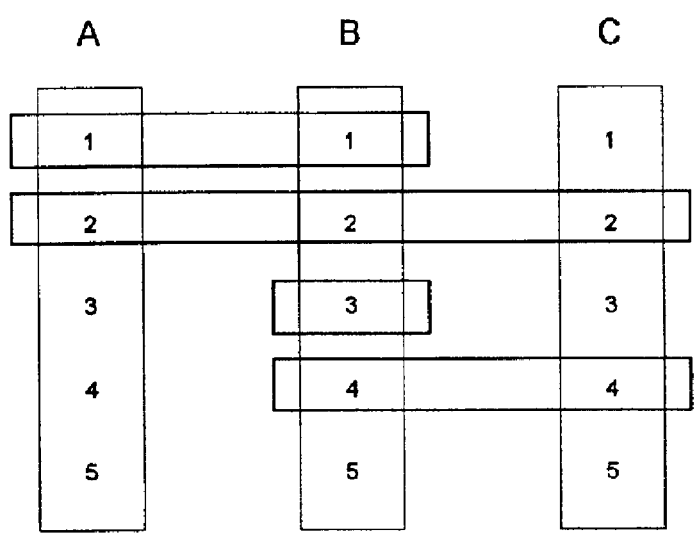
FIG. 16 depicts a "multicast group" of three devices each having five time-slots.

FIG. 16 shows a multicast group of three devices "A", "B" and "C", each of which is assumed to have 5 time-slots, labelled "1" through "5" respectively. Multicast groups are dynamic groupings of devices which satisfy multicast requirements. In the FIG. 16 example, time-slot 1 from device A and device B is to be received as the end point of a multicast from some source in the fabric. The box surrounding time-slot 1 in devices A and B indicates that these two are joined in this relationship. Likewise, time-slot 2 is a multicast connection that will be received by all three devices; time-slot 3 is a unicast connection received only by device B; time-slot 4 is a multicast connection that is received by both device B and device C; and, time-slot 5 is unallocated.

In order to satisfy these requests all three devices are represented as a single notional device to the connection scheduling algorithm. The connection requests for each time-slot of this notional device constitutes the union of all of the connection requests. That is, if as a result of the union of all requests, one time-slot has two requests, one request will fail due to over-allocation in the connection scheduling algorithm. Therefore, there can only be one connection request for each time-slot of the single notional device. The box joining time-slot 1 of devices A and B represents the unicast call on the notional device represented to the connection scheduling algorithm. If there is no over-allocation on the notional device, then all connection requests will be satisfied.

After completion of the connection scheduling algorithm's task, a translation is applied to the results output by the algorithm to satisfy the particular requests at each time-slot of each actual device. This translation depends on the particular connection request. For example, if time-slot 1 of each of devices A and B are to receive from the same source as the endpoints in a multicast connection, then the same switch settings are set in the switch fabric for the ports connecting to the two devices to deliver the same data stream to each, and the two devices are individually set with the same switch settings. The setting for time-slot 1 of device C is left empty, since this time-slot does not participate in this multicast connection.

Different translations can be applied to different kinds of multicast connections. For example, time-slot 4 could represent the ingress source of a working and protect stream of a 1+1 protection scheme. In this case, a failure on the working stream requires rapid switch-over from the working source to the protect source. Since the two are considered as part of the same multicast group, the connection scheduling algorithm need not be rerun to satisfy the switch over request since all receivers of the working time-slot can pull data from the protect time-slot instead: a different translation of the previous connection scheduling is sufficient to satisfy the working to protect switch-over.

Multicast groups prevent conflicts in either the switch fabric or in the devices themselves, because where switch settings are required, at each device the switch settings are the same (or empty); and, at each port connected to a port of a device in a multicast group, the switch settings are either the same (or empty). Multicast groups accordingly solve the multicast problem for a variety of protection schemes including 1+1, 1:N, UPSR and 2- and 4-BLSR, as well as satisfying test port needs. Multicast groups in fact solve the multicast problem generally, but not perfectly since ports not participating in connections are not allowed to receive other traffic. When devices are copies of each other, however, the multicast problem is solved perfectly.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of adding a new connection (c, d) to a switch fabric, said fabric comprising a set I of k input elements, a set M of m switch elements, and a set O of l output elements, each one of said input elements contributing one input to each one of said m switch elements, each one of said output elements receiving one output from each one of said switch elements, and each one of said switch elements receiving one input from each one of said input elements and selectably switching said received inputs to one or more of said output elements, said switch fabric having a state $S_m$ characterizing said m switch elements as a set of ordered pair connections (i, j) wherein:

(i) i is an input of a connection (i, j);

(ii) j is an output of said connection (i, j);

(iii) $(i, j) \in S_m$ if and only if $j^{th}$ one of said output elements is coupled to an $i^{th}$ one of said input elements through one of said switch elements, (iv) said state $S_m$ having a range range($S_m$) wherein if j ∈ range($S_m$) then (i, j) ∈ $S_m$ for some i ∈ I;

(v) said state $S_m$ having a domain domain($S_m$) wherein if i ∈ domain($S_m$) then (i, j) ∈ $S_m$ for some j ∈ O;

said method comprising:

(a) determining if said switch state $S_m$ exists wherein c ∉ domain($S_m$) and d ∉ range($S_m$);

(b) if said switch state $S_m$ exists wherein c ∉ domain($S_m$) and d ∉ range($S_m$), adding said new connection to $S_m$ as (c, d);

(c) if said switch state $S_m$ does not exist wherein c ∉ domain($S_m$) and d ∉ range($S_m$), determining if said switch state $S_m$ exists wherein c ∉ domain($S_m$);

(d) if said switch state $S_m$ does not exist wherein c ∉ domain($S_m$), terminating said method by indicating that c is fully allocated;

(e) if said switch state $S_m$ exists wherein c ∉ domain($S_m$), determining if a switch state $S_n$ exists wherein d ∉ range($S_n$);

(f) if said switch state $S_n$ does not exist wherein d ∉ range($S_n$), terminating said method by indicating that d is fully allocated;

(g) if said switch state $S_n$ exists, joining said switch state $S_m$ and said switch state $S_n$ to form a union J by:

(i) allocating a label u to each element (i', j') in J if (i', j') ∈ $S_m$;

(ii) allocating a label v to each element (i', j') in J if (i', j') ∈ $S_n$; and, (iii) adding said new connection (c, d) to J.

2. A method as defined in claim 1, further comprising:

(a) after adding said new connection (c, d) to J, allocating said label u to said new connection (c, d);

(b) determining if there exists a connection (i', d) ∈ J wherein said label u has previously been allocated to said connection (i', d) ∈ J;

(c) if there does not exist a connection (i', d) ∈ J wherein said label u has previously been allocated to said connection (i', d) ∈ J, terminating said method;

(d) if there exists a connection (i', d) ∈ J wherein said label u has previously been allocated to said connection (i', d) ∈ J, reallocating said label v to said connection (i', d) ∈ J;

(e) determining if there exists a connection (i', j') ∈ J wherein said label v has previously been allocated to said connection (i', j') ∈ J;

(f) if there does not exist a connection (i', j') ∈ J wherein said label v has previously been allocated to said connection (i', j') ∈ J, terminating said method;

(g) if there exists a connection (i', j') ∈ J wherein said label v has previously been allocated to said connection (i', j') ∈ J, reallocating said label u to said connection (i', j') ∈ J;

(h) setting d=j';

(i) repeating said method commencing at claim 2(b).

3. A method as defined in claim 1, further comprising:

(a) after adding said new connection (c, d) to J, allocating said label v to said new connection c, d);

(b) determining if there exists a connection (c, j') ∈ J wherein said label v has previously been allocated to said connection (c, j') ∈ J;

(c) if there does not exist a connection (c, j') ∈ J wherein said label v has previously been allocated to said connection (c, j') ∈ J, terminating said method;

(d) if there exists a connection (c, j') ∈ J wherein said label v has previously been allocated to said connection (c, j') ∈ J, allocating said label u to said connection (c, j') ∈ J;

(e) determining if there exists a connection (i', j') ∈ J wherein said label u has previously been allocated to said connection (i',j') ∈ J;

(f) if there does not exist a connection (i', j') ∈ J wherein said label u has previously been allocated to said connection (a', j') ∈ J, terminating said method;

(g) if there exists a connection (i', j') ∈ J wherein said label u has previously been allocated to said connection (i', j') ∈ J, allocating said label v to said connection (i', j') ∈ J;

(h) setting c=i'; and, (i) repeating said method commencing at claim 3(b).

4. A method as defined in claim 2, further comprising, before allocating said label u to said new connection added to J:

(a) determining the number X of connections requiring reallocation of labels if said label u is allocated to said new connection added to J;

(b) determining the number Y of connections requiring reallocation of labels if said label v is allocated to said new connection added to J;

(c) if X≦Y, continuing said method commencing at claim 2(a); and, (d) if X>Y, continuing said method commencing at claim 3(a).

5. A method as defined in claim 3, further comprising, before allocating said label v to said new connection added to J:

(a) determining the number X of connections requiring reallocation of labels if said label u is allocated to said new connection added to J;

(b) determining the number Y of connections requiring reallocation of labels if said label v is allocated to said new connection added to J;

(c) if Y≦X, continuing said method commencing at claim 3(a); and, (d) if Y>X, continuing said method commencing at claim 2(a).

6. A method as defined in claim 1, further comprising, before claim 1(a):

(a) defining a multicast group comprising a first plurality of said input elements and said output elements, each of said input elements and said output elements having a second plurality of time slots;

(b) for each one of said time slots, forming a union of all connection requests received in respect of each of said input elements and said output elements;

(c) representing said multicast group as a single pair of said input elements and said output elements;

(d) associating said union with said multicast group;

(e) performing said claim 2 method commencing at claim 2(a); and, (f) for each one of said time slots, translating connection requests applied to said multicast group to equivalent connection requests applied to each one of said first plurality of said input elements and said output elements.

* * * * *